US012114135B2

(12) United States Patent
Sø et al.

(10) Patent No.: US 12,114,135 B2
(45) Date of Patent: Oct. 8, 2024

(54) HEARING DEVICE TO BE WORN AT LEAST PARTLY BEHIND AN EAR OF AN USER

(71) Applicant: Oticon A/S, Smørum (DK)

(72) Inventors: Rune Sø, Smørum (DK); Jens Troelsen, Smørum (DK); Morten Thougaard, Smørum (DK); Oleksandr Rybalko, Smørum (DK)

(73) Assignee: OTICON A/S, Smørum (DK)

( * ) Notice: Subject to any disclaimer, the term of this patent is extended or adjusted under 35 U.S.C. 154(b) by 271 days.

(21) Appl. No.: 17/859,172

(22) Filed: Jul. 7, 2022

(65) Prior Publication Data

US 2023/0016254 A1 Jan. 19, 2023

(30) Foreign Application Priority Data

Jul. 13, 2021 (EP) .................................... 21185353

(51) Int. Cl.

*H04R 25/00* (2006.01)
*H01Q 1/27* (2006.01)
*H01Q 7/00* (2006.01)
*H01Q 9/42* (2006.01)

(52) U.S. Cl.

CPC ........... *H04R 25/609* (2019.05); *H01Q 1/273* (2013.01); *H01Q 7/00* (2013.01); *H01Q 9/42* (2013.01); *H04R 25/554* (2013.01); *H04R 2225/51* (2013.01)

(58) Field of Classification Search

CPC .. H04R 25/609; H04R 25/554; H04R 225/51; H01Q 1/273; H01Q 7/00

See application file for complete search history.

(56) References Cited

U.S. PATENT DOCUMENTS

| | | | | |
|---|---|---|---|---|
| 2016/0183015 | A1 | 6/2016 | Søet al. | |
| 2017/0280258 | A1* | 9/2017 | Sø et al. | H04R 25/65 |
| 2018/0255409 | A1* | 9/2018 | Sø | H01Q 1/24 |
| 2020/0374640 | A1* | 11/2020 | Troelsen | H04R 25/604 |

FOREIGN PATENT DOCUMENTS

EP 3 591 996 A1 1/2020

OTHER PUBLICATIONS

Extended European Search Report, issued in Priority Application No. 21185353.6, dated Dec. 22, 2021.

* cited by examiner

*Primary Examiner* — Sunita Joshi

(74) *Attorney, Agent, or Firm* — Birch, Stewart, Kolasch & Birch, LLP

(57) ABSTRACT

A hearing device to be worn at least partly behind an ear of a user, comprising a housing; and a radio-frequency antenna arranged at least partly inside the housing is disclosed. The radio-frequency antenna is configured to receive and/or transmit electromagnetic radio-frequency signals, wherein the radio-frequency antenna comprises: at least one first antenna element with a plate like first surface, wherein the first antenna element has a feed for electrically connecting the radio-frequency antenna, and wherein the first antenna element has a ground.

18 Claims, 3 Drawing Sheets

HEARING DEVICE TO BE WORN AT LEAST PARTLY BEHIND AN EAR OF AN USER

The present disclosure generally relates to hearing devices to be worn at least partly behind an ear of a user. More particularly, the disclosure relates to a hearing device to be worn at least partly behind an ear of a user comprising a housing and a radio-frequency antenna arranged at least partly inside the housing, the radio-frequency antenna configured to receive and/or transmit electromagnetic radio-frequency signals.

Hearing devices to be worn at least partly behind an ear of a user for enhancing the user's hearing experience may advantageously receive and/or transmit electromagnetic radio-frequency signals in order to wirelessly communicate with other devices. Hereby, the experience of the user of the hearing device may be beneficially enhanced. In order to establish a wireless communication with other devices, a radio-frequency antenna is needed.

Generally, hearing devices to be worn or arranged at least partly behind an ear of the user are not constructed differently depending on being used on either the left or the right ear only. Thus, when providing a radio-frequency antenna at least partly inside the housing of such a hearing device there is the challenge in the antenna performance being substantially the same regardless of the hearing device being worn behind the right or the left ear of a user.

Additionally, the resonant frequency of the radio-frequency antenna or of antenna elements of the radio-frequency antenna when placed near a head differs from the resonant frequency of the radio-frequency antenna or of antenna elements of the radio-frequency antenna when placed substantially free from other objects.

Therefore, there is a need to provide a solution that allows for an improved wireless communication of a hearing device to be worn at least partly behind an ear of a user.

SUMMARY

According to an aspect a hearing device to be worn at least partly behind an ear of a user is provided, wherein the hearing device comprises a housing; and a radio-frequency antenna arranged at least partly inside the housing. The radio-frequency antenna may be arranged entirely inside the housing, i.e. the radio-frequency antenna may be formed so that. The radio-frequency antenna may be configured to receive and/or transmit electromagnetic radio-frequency signals, wherein the radio-frequency antenna comprises: at least one first antenna element with a plate like first surface, wherein the first antenna element has a feed for electrically connecting the radio-frequency antenna, and wherein the first antenna element has a ground. Optionally, the first antenna element may have at least one opening for a part of a structure of the hearing device. The first antenna element may comprise an electrically conductive surface part. The at least one opening may be formed, at least partly, by a loop structure or arm, such as part of an Inverted F-antenna or loop antenna. Hereby, a relatively small antenna element may be provided which improves the wireless communication of the hearing device. Due to the compact size of the first antenna element, it may easily be integrated into the housing of the hearing device. The opening may enable to place a structure comprising other components or elements, such as an electrical element, of the hearing device in the vicinity of the radio-frequency antenna. A component placed on such a structure may then be arranged so that it does not have physical contact with the loop or arm forming the opening. This could mean that an air gap is formed between a component placed on the structure and the structure forming the opening.

Preferably, the at least one antenna element is constructed as an inverted F-antenna or at least is constructed similar to or like an inverted F-antenna. This enables a relatively small antenna element with enhanced performance so that the hearing device may sufficiently communicate with other devices. Furthermore, if the at least one antenna element is constructed as an inverted F-antenna or like an inverted F-antenna, the radiation direction may be controlled such that the radiation field toward the user may be minimized.

Furthermore, it is presently considered advantageous that a printed circuit board may be arranged on or near a rear side of the plate like first surface of the first antenna element. Hereby, a structure comprising elements or components of the hearing device such as a connection member for audio sources, e.g. a telecoil, and/or other elements or components such as microphones/input transducers may be arranged with the printed circuit board. Preferably, the structure may partly comprise a substrate, in particular at least part of a flex substrate. The elements or components may protrude through the at least one optional opening for a structure of the hearing device.

The ground of the at least one antenna element may preferably be formed on or include a plane part. The ground, or ground plane, of the at least one first antenna element may be formed on the printed circuit board arranged on or near the rear side of the first surface of the first antenna element, or on or in another printed circuit board. Alternatively, the ground may be disposed adjacent the plate like first surface of the first antenna element or be formed by a part of the plate like first surface of the first antenna element. In the present disclosure, the ground for the antenna may include additional elements, such as a metallic component, such as a battery. An inductive communication coil may be arranged in the hearing device. Such an inductive communication coil may be used for inductively communicating with a contralateral hearing device. The inductive communication coil may be arranged at the end of the hearing device opposite the end with the antenna, such as at the other/opposite side of the battery. Alternatively, the inductive communication coil may be arranged at a space between an output transducer, such as a speaker, and the battery. The space may be below a printed circuit board making up at least part of the antenna.

Preferably, the housing of the hearing device is arranged as a behind the ear housing. The housing may preferably be arranged behind the left ear and the right ear of a user.

Generally, the radio-frequency antenna may form a resonant structure when the antenna is loaded by the presence of a head or even in free space. The resonant frequency of the antenna is preferably in the range 50 MHz to 10 GHz, such as in the ISM band(s), such as around 2.4 GHz, such as around 5 GHz. This may be advantageous when dealing with the Bluetooth communication protocol. Designing the radio-frequency antenna for other suitable frequencies or frequency intervals is also possible.

The hearing device, in particular the housing of the hearing device, may further comprise a first part and at least one further part, wherein the first part at least partly comprises the radio-frequency antenna and a connection member connecting the housing to an in the ear housing. Preferably, the first part of the hearing device is arranged in the front and/or the top side of the hearing device when the hearing device is carried in its intended position. The first antenna element may be arranged at, i.e. near to the first part of the housing. If the housing comprises bends, such as two or more parts constituting the first part, the first antenna element may comprise several connected parts so that the electrically conductive material of the first antenna element is near each top part of the housing. Preferably, the first part comprises at least the first antenna element of the hearing device.

The first surface of the first antenna element may have a substantially plane surface, as this is the most easy to arrange in a housing to be worn at an ear of a user and these flat shapes are also easy to manufacture. Alternatively, the first surface may include one or more protrusions, either smooth or discontinuous, which may for instance fit into a recess in the housing. The first surface is preferably provided as a sheet or coating on a substrate.

The radio-frequency antenna may further comprise at least one second electrically conductive antenna element with a plate like second surface, wherein the second surface of the at least one second antenna element may preferably partly extend in a plane substantially orthogonal to the first surface of the first antenna element. Additionally, the radio-frequency antenna may further comprise at least one third electrically conductive antenna element with a plate like third surface, wherein the third surface of the at least one third antenna element may preferably partly extend in a plane substantially orthogonal to the first surface of the first antenna element and wherein the third antenna element is arranged opposite to the second antenna element with regard to the first antenna element. This allows for an improved focus of the nearfield while being able to integrate the second antenna element and the third antenna element into a hearing device which may be worn at least partly behind an ear of a user. Preferably, both the second antenna element and the third antenna element may extend in a plane directed in a forward or downward direction with respect to a user of the hearing device when the hearing device is carried in its intended position.

The second surface of the second antenna element and the third surface of the third antenna element may at least partly form a dihedral angle to the first surface of the first antenna element, wherein the dihedral angle may be in the range of 0 to 180 degrees, such as in the range of 10 to 160 degrees, such as in the range of 20 to 140 degrees, such as in the range of 30 to 120 degrees, such as in the range of 40 to 100 degrees, such as in the range of 50 to 95 degrees, such as in the range of 60 to 90 degrees, such as in the range of 70 to 80 degrees, such as around 90 degrees.

Preferably, the at least one second antenna element and/or the at least one third antenna element may at least partly surround at least one component or element of the hearing device. It is also preferred that the at least one second antenna element and the at least one third antenna element may be arranged between at least one component or element of the hearing device and the housing of the hearing device. Preferably, the at least one second antenna element and the at least one third antenna element are located directly below the housing.

The at least one second antenna element and/or the at least one third antenna element may be formed as a non-resonant element, which could be in the form as wings or flaps extending from a base. Preferably, the at least one second antenna element and/or the at least one third antenna element is electrically connected to the at least one first antenna element. Preferably, at least one second antenna element and/or the at least one third antenna element may be electrically connected to the first surface at one or multiple places, or continuously along substantially the length of the non-resonant element, such as the entire length or part of the length, e.g. in sections or in a single length. The at least one second antenna element and/or the at least one third antenna element may be attached to the first surface, so that a plurality of non-resonant elements may be attached. The presence of a non-resonant element or the non-resonant elements is contemplated to enhance the performance of the radio-frequency antenna as it improves the bandwidth performance. Further to this, it has surprisingly been seen that the left-right performance is improved, this means that e.g. a hearing device having an antenna unit comprising non-resonant elements may be placed at either side of the head.

The at least one second antenna element and/or the at least one third antenna element may at least partly extend in a plane, wherein the plane is substantially directed in a downward and/or forward direction from the at least one first antenna element. Preferably, the downward and/or forward direction refers to the direction of the hearing device when the hearing device is carried in its intended position.

The presence of the non-resonant element or the non-resonant elements further improves the bandwidth of the antenna unit. The at least one second antenna element and the at least one third antenna element may be formed symmetrical, in particular mirror-symmetrical, to each other. It could, however, advantageously be arranged that one non-resonant element is larger than the other, so that at one side of the hearing device a non-resonant element has a first size, or area, and at the opposite side, a non-resonant element is arranged to have a second size being smaller or larger than the first size. This is contemplated to compensate for asymmetries in the over-all antenna structure, which could include asymmetrically placed feed and/or asymmetrically formed battery connections.

It is preferred that the first part of the hearing device comprises at least the first, second and third antenna elements. In some hearing devices, two or more non-resonant elements may be attached to the first surface of the first antenna unit. Generally, it has been found that non-resonant elements enhance the performance of the radio-frequency antenna, by adding to the tuning of the antenna unit to the desired frequency band where the intended use for a hearing device of this size falls in the GHz range and/or for providing a larger bandwidth and/or establishing an antenna for a hearing device in which left/right performance of the antenna is improved, this means that the antenna performs substantially equally well independent at which side of the head of the user it is placed.

The non-resonant elements may have an overall geometry corresponding to an oblong, square or any polygonal geometry. Further, the non-resonant elements may be composed of a single section or two or even more electrically connected sections. Preferably, when the radio-frequency antenna is arranged in the housing, the first surface of the first antenna element is arranged at the top part of the housing and the non-resonant elements extend along a sidewall of the housing, preferably downwards. This provides a well performing radio-frequency antenna and further minimize the difference in performance depending on whether the housing or the hearing device is placed at the left or right ear of the user. Normally, hearing instruments are formed so that they may be used at either side of the head, i.e. without requiring the housing to be worn on a specific ear-side. In case a non-resonant element is composed of two or more sections, the non-resonant element may comprise one or more bends.

When arranged in a housing, the first surface of the first antenna element preferably does not coincide with the second and third surface of the second and third antenna elements. This means that the first surface may be displaced relative to the second and third surface, or that an angle is between them, e.g. between the surface normal of the first surface and the surface normal of the second and third surface, wherein the angle is different from zero. Preferably, these planes are flat, or substantially flat, meaning that any three points not in a line on the electrically conductive material could be used to define or characterize the plane. The at least one second antenna element and/or the at least one third antenna element may be configured to operate in resonance. This is contemplated to enhance the operation of a radio-frequency antenna which provides a similar performance whether the hearing device is arranged on the left or the right side of a head of the user. Additionally, a high, or improved, efficiency and a good bandwidth may be obtained.

The at least one second antenna element and the at least one third antenna element may form a loop antenna element. Preferably, the width of the second antenna element, the third antenna element and/or the loop antenna element is optimized in a tradeoff between impedance bandwidth and radiation efficiency. Preferably, a part of the loop antenna element may also be comprised by a printed circuit board which may be connected to a rear side of the first antenna element. It is furthermore preferred that the at least one second antenna element and the at least one third antenna element are mechanically connected to each other. The loop antenna element may extend along or be arranged near a bottom part of the housing. Preferably, the bottom part of the housing of the hearing device is at least partly arranged on the bottom or rear side of the hearing device when the hearing device is carried in its intended position. The loop antenna element allows for a high integration in the mechanics of a hearing device and only causes minor differences between the hearing device being arranged on the right side or the left side of the head of the user. Additionally, good bandwidth and high efficiency may be provided.

The hearing device may further comprise an audio outlet and/or a hook and/or an electrical connection to e.g. a speaker unit to be positioned in the ear canal of the user, in in order to transmit audio signals into the ear of the user, either airborn or electrical to an output transducer. The loop antenna element may then at least partly surround such structure. Such an arrangement is contemplated as at least one way of integration of the radio-frequency antenna into the compact hearing device.

When comprising the at least one structure of the hearing device may be arranged inside the at least one optional opening of the first antenna element, wherein further elements or components of the hearing device, in particular at least one microphone element and/or at least one telecoil, are mounted on the at least one structure. Preferably, the at least one structure is a part of the at least one first antenna element. Furthermore, it is preferred that the at least one structure is at least partly composed of an electrically conductive material, for example a flexible substrate. Preferably, further elements of the hearing device are electrically connected to the at least one structure.

At least one element or component of the hearing device, in particular at least one microphone element, is integrated into or comprised by the at least one first antenna element. In connection with integrating at least one microphone element into the at least one first antenna element it is preferred that the signals generated by the at least one microphone element are routed to the ground or the ground plane of the at least one first antenna element. Furthermore, additional elements or components of the hearing device, for example a telecoil and/or additional microphones, may be integrated into or comprised by the at least one first antenna element.

Advantageously, a hearing aid may comprise an antenna as described herein, where at least part of the antenna extends from a structure being at least part of a ground plane, such as a printed circuit board, and the extending part may form a loop-shaped part which is connected to a feed at one end and loops back to ground at the other end thereof. An opening may then be formed by the loop part. In the opening form by the loop-shaped part, a component may be arranged, such as a telecoil, a microphone, a button, or the like electrical components. In or on the loop-shaped part, a component may be arranged, such as a microphone. This could allow signal lines to/from such a microphone to be routed through the loop-shaped part and thereby ensure that they do not interfere with the antenna performance. The lines may be routed through the ground connected for such antenna structure. The antenna structure may be inverted-F-like or loop-like or constitute an inverted-F structure or constitute a loop structure or constitute a partial loop structure extending from a base part, such as a ground plane or a part thereof. The antenna structure may be or include the elsewhere discussed first antenna element.

Generally, a better performance of a radio-frequency antenna allows a lower power consumption of both the transmitter and receiver for a given link performance. The radio-frequency antenna according to the present disclosure may be used for wireless hearing devices in which information is wirelessly communicated between a wireless accessory device and a hearing device. Portable and wearable devices usually have limited operation time limited by the amount of power available from small batteries, and thus lowering power consumption to extend battery life is a major issue for such devices.

The hearing device may comprise an audio converter for reception of an acoustic signal and conversion of the received acoustic signal into a corresponding electrical audio signal. The hearing device may comprise a signal processor for processing the electrical audio signal into a processed audio signal so as to compensate a hearing loss of a user of the hearing device. The hearing device may comprise a transducer connected to an output of the signal processor for converting the processed audio signal into an output signal. The hearing device may comprise a transceiver for wireless data communication, wherein the transceiver is connected to the radio-frequency antenna which is adapted for electromagnetic field emission and/or electromagnetic field reception. These components in the hearing device may be exchanged or supplemented with other components, devices and/or units having one or more additional functions.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1A:
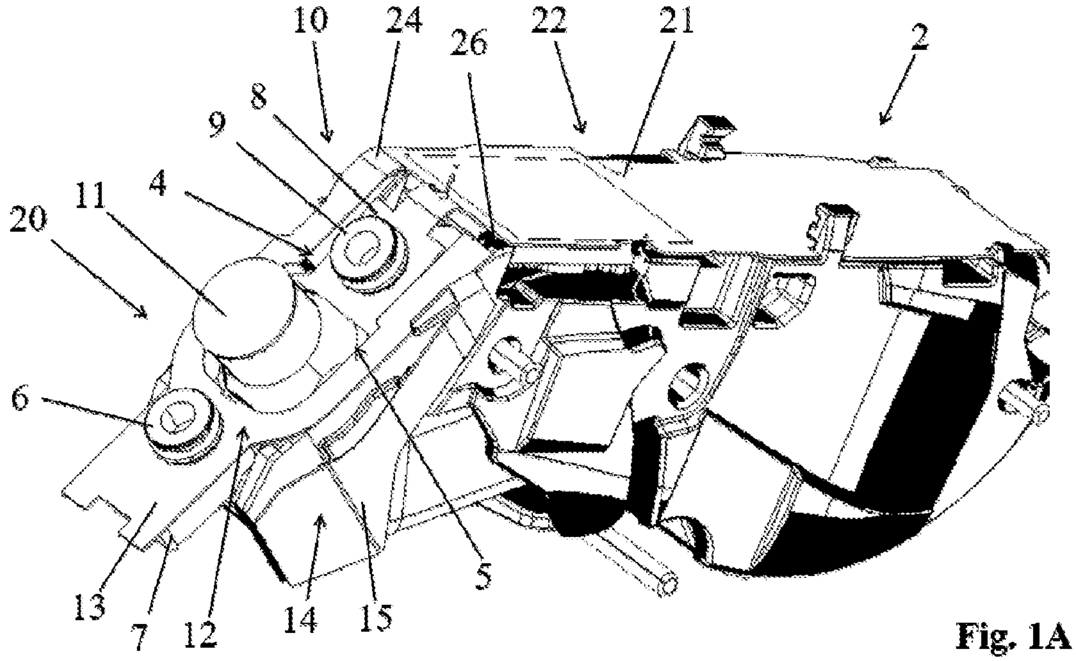
FIG. 1A schematically shows a perspective view of a first embodiment of a hearing device comprising a radio-frequency antenna from a first side.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing device as used herein may be, or include, a hearing aid. A hearing aid is generally adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. 'Improving or augmenting the hearing capability of a user' may include compensating for an individual user's specific hearing loss, such as compensation for a user's individual hearing loss via application of gain to an input signal, such as frequency dependent gain. Thus, the processor may be configured to process the input signal in accordance with a hearing loss of a specific user of the hearing device.

The "hearing device" may further refer to a device such as a hearable, an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of the middle ear of the user or electric signals transferred directly or indirectly to the cochlear nerve and/or to the auditory cortex of the user.

The hearing device is adapted to be worn at least partly behind the ear of a user. This may include i) arranging a unit of the hearing device behind the ear with a tube leading air-borne acoustic signals into the ear canal or with a receiver/loudspeaker arranged close to or in the ear canal and connected by conductive wires (or wirelessly) to the unit behind the ear, such as in a Behind-the-Ear type hearing aid, and/or ii) arranging the hearing device partly in the pinna and/or in the ear canal of the user such as in an In-the-Ear type hearing aid or In-the-Canal type hearing aid, or iii) arranging a unit of the hearing device attached to a fixture implanted into the skull bone such as in a Bone Anchored Hearing Aid or a Cochlear Implant, or iv) arranging a unit of the hearing device as an entirely or partly implanted unit such as in a Bone Anchored Hearing Aid or a Cochlear Implant. The hearing device may be implemented in one single unit (housing) or in a number of units individually connected to each other.

The hearing device may be part of a "hearing system", wherein the hearing system refers to a system comprising one or two hearing devices, and a "binaural hearing system" or a "bimodal hearing system" refers to a system comprising two hearing devices where the devices are adapted to cooperatively provide audible signals to both of the user's ears either by acoustic stimulation only, acoustic and mechanical stimulation, mechanical stimulation only, acoustic and electrical stimulation, mechanical and electrical stimulation or only electrical stimulation.

The hearing system or binaural hearing system may further include one or more auxiliary device(s) that communicates with at least one hearing device, the auxiliary device affecting the operation of the hearing devices and/or benefitting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Preferably, the wireless communication link between the hearing device and the auxiliary device and/or another hearing device is provided by a wireless communication link between a radio-frequency antenna of the hearing device to the auxiliary devices or to another hearing device. Auxiliary devices may include at least one of a remote control, a remote microphone, an audio gateway device, a wireless communication device, e.g. a mobile phone (such as a smartphone) or a tablet or another device, e.g. comprising a graphical interface, a public-address system, a car audio system or a music player, or a combination thereof. The audio gateway may be adapted to receive a multitude of audio signals such as from an entertainment device like a TV or a music player, a telephone apparatus like a mobile telephone or a computer, e.g. a PC. The auxiliary device may further be adapted to (e.g. allow a user to) select and/or combine an appropriate one of the received audio signals (or combination of signals)

for transmission to the at least one hearing device. The remote control is adapted to control functionality and/or operation of the at least one hearing device. The function of the remote control may be implemented in a smartphone or other (e.g. portable) electronic device, the smartphone/electronic device possibly running an application (APP) that controls functionality of the at least one hearing device.

In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to (relatively) enhance a target acoustic source among a multitude of acoustic sources in the user's environment and/or to attenuate other sources (e.g. noise). In one aspect, the directional system is adapted to detect (such as adaptively detect) from which direction a particular part of the microphone signal originates. This may be achieved by using conventionally known methods. The signal processing unit may include an amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing devices, the output unit may include one or more output electrodes for providing the electric signals such as in a Cochlear Implant.

In the figures, similar elements have been given similar reference numerals.

Radio-frequency antennas for transmission of electromagnetic radio-frequency signals are preferably designed to have an electrical size of at least one quarter of the wavelength of the transmitted signal, since this generally allows high antenna efficiency and wide bandwidth. However, many apparatuses do not have room for an antenna large enough to satisfy this condition. For a radio-frequency signal with a frequency of e.g. 100 MHz, one quarter of the wavelength equals 0.75 m. It is thus common to utilize antennas that are physically considerably smaller than one quarter of the wavelength. Such antennas are generally referred to as "electrically short" or "electrically small" antennas. The radio-frequency antenna described herein preferably is such an electrically short antenna.

Now referring to FIG. TA to 1C, which schematically show perspective views of a first embodiment of a hearing device 2 comprising a radio-frequency antenna 10. The radio-frequency antenna 10 comprises at least one first antenna element 12 with a plate like first surface 13, wherein the first antenna element 12 comprises an opening 4. This opening 4 may be omitted and replaced with a solid part which then is included in the antenna element, thereby providing a closed surface at the location of the opening 4. The opening 4 allows for an element 11, such as an electrical component, to be fitted better inside the hearing device housing, e.g. with a reduced overall space requirement. The element 11 is mounted on a substrate 8, which may in particular be a flex substrate. A second microphone 9, in particular a rear microphone, and a transducer 11 are arranged or mounted on the substrate 8. The substrate 8 carrying the element 11 and the second microphone 9 is not part of the antenna structure.

A first microphone 6, in particular a front microphone, of the hearing device 2 is arranged on the first surface 13 of the first antenna element 12. Preferably, the signals of the first microphone 6 may be routed in, through or to a ground connection 24 of the first antenna element 12.

On the back surface of the first antenna element 12, opposite to the first microphone 6 or rather first microphone snout 6, a part 7 of a mems microphone may be arranged. An arm structure 5 is electrically connected to a ground plane 21 of the hearing device 2 via a feed 26.

Figure 1B:
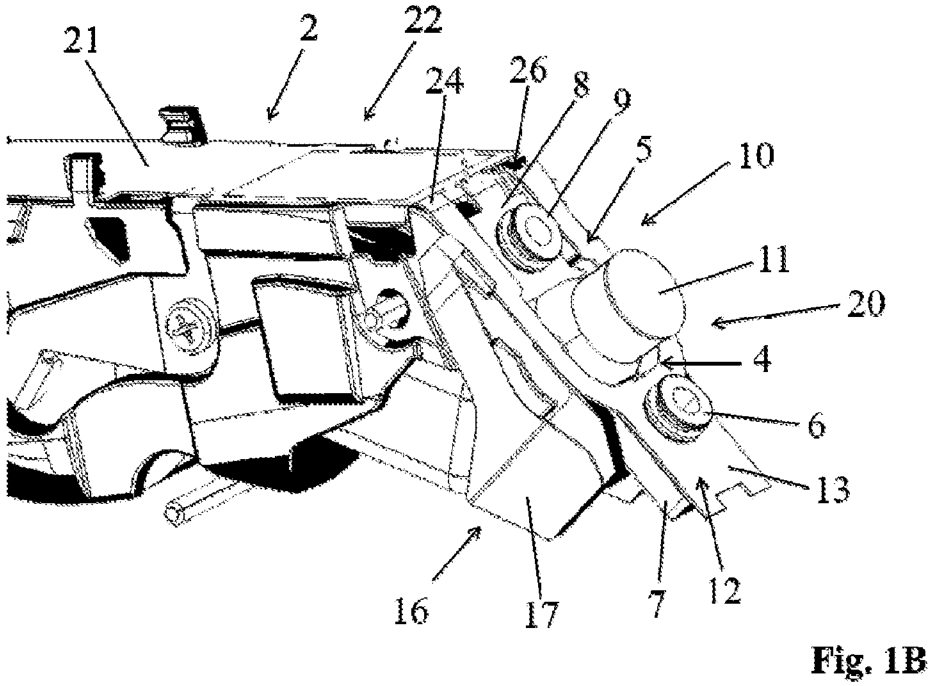
FIG. 1B schematically shows a perspective view of the first embodiment of the hearing device shown in FIG. 1A from a second side.
Figure 1C:
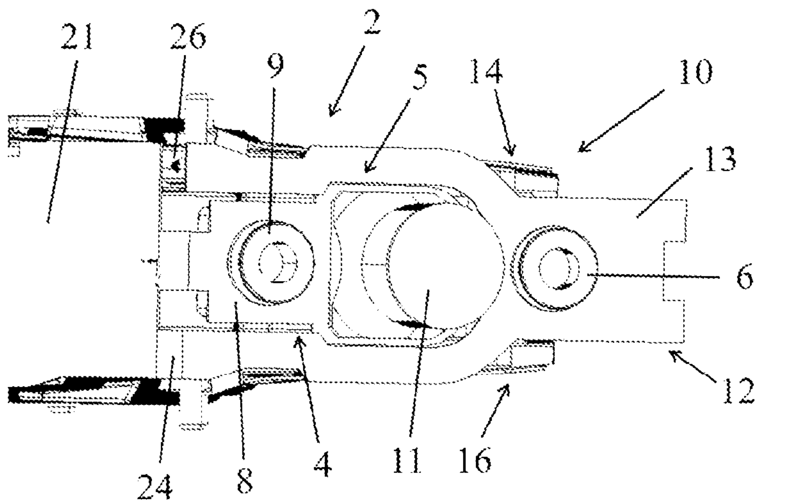
FIG. 1C schematically shows a top view of the first embodiment of the hearing device shown in FIG. 1A.

In the embodiment of FIG. 1, the hearing device 2 is a hearing aid as it is configured to process sound in order to compensate for a user's specific hearing loss prior to providing an output signal that the user can perceive as sound.

The first antenna element 12, the arm 5 and the ground 21 together establish an antenna which functions or operates as an Inverse-F antenna structure.

A second electrically conductive antenna element 14 with a plate like second surface 15 and a third electrically conductive antenna element 16 with a plate like third surface 17 extend in a plane substantially orthogonal to the first surface 13 of the first antenna element 12. The second electrically conductive antenna element 14 extends in the lengthwise direction of the hearing device 2.

The second antenna element 14 and the third antenna element 16 are arranged at opposite sides of each other with regard to the first antenna element 12. The second antenna element 14 and the third antenna element 16 are formed as non-resonant elements. The non-resonant elements 14 and 16 may be arranged relative to the conductive material of the first antenna element 12 in order to allow for an improved focus of the electromagnetic nearfield inside the hearing device 2. The relationship of the area of the surfaces 15 and 17 of the non-resonant elements 14 and 16 to the area of the first surface 13 depends on the desired performance, it is presently preferred that the relationship between the area of the surfaces 15 and 17 of the non-resonant elements 14 and 16 to the area of the first surface 13 is in the range 1:10 to 10:1.

The non-resonant elements 14 and 16 may be used to adjust the load that the presence of the head of a user has on the radio-frequency antenna 10. Preferably, the size of the wings or elements 14 and 16 is determined such that the performance on the left ear and the right ear is substantially balanced.

The radio-frequency antenna 10 may be constructed with a single non-resonant element, two non-resonant elements, three non-resonant elements, four non-resonant elements, or even more non-resonant elements. It has been identified that at least one non-resonant element will help tune the radio-frequency antenna 10 to a desired operating frequency and/or desired bandwidth.

The assembly of the radio-frequency antenna 10 and the other components of the hearing device 2 are to be mounted in a housing (not shown) in order to protect the radio-frequency antenna 10 and the other component from the surrounding environment and to provide a pleasing look and wearing comfort for the user of the hearing device 2. Preferably, if the radio-frequency antenna 10 is arranged inside a housing of a hearing device, the first surface 13 of the first antenna element 12 is arranged at a top wall of the housing, wherein the surfaces 15 and 17 of the second antenna element 14 and the third antenna element 16 at least partly extend along a sidewall of the housing. The second antenna element 14 and the third antenna element 16 may be electrically connected to the first antenna element 12 at one spot respectively. Alternatively, the second antenna element 14 and the third antenna element 16 may have multiple connections to the first antenna element 12.

The hearing device 2 is arranged to be worn at least partly behind an ear of a user and thus is a BTE-type hearing device 2. This means that the shown components or elements are intended to be placed in a housing configured for being placed behind the pinna of a user, such as in a single housing. It is presently preferred that the housing for the radio-frequency antenna 10 may be placed behind the ear of the user. Such a housing may include a speaker, which is sometimes referred to as a receiver, placed in the housing, this configuration is often called behind-the-ear, or in a device to be placed in or at the ear canal, this configuration is often called a receiver-in-the-ear. In further instances, the housing may be connected to an implant, such as a Cochlear Implant, where sound is received by an input transducer in the housing and converted to a digital signal, which is then processed and/or transmitted to the implant.

The hearing device 2 is composed of one first part 20 and at least one further part 22, wherein the first part 20 comprises the first antenna element 12, the second antenna element 14 and the third antenna element 16. Additionally, the first part 20 may comprise a connection member connecting the housing to an in the ear housing. Preferably, the first part 20 of the hearing device 2 corresponds to a forward and/or top side of the hearing device 2 when the hearing device 2 is carried by a user in its intended position.

The first antenna element 12 is connected via a ground 24, in particular via a ground connection 24, to the plane 21 of the hearing device 2. Additionally, the first antenna element 12 is electrically connected via a feed 26.

As shown in FIG. 1, the ground 21 may be fixed to a structure of the hearing device, such as a rack or the like, by means of two fixation members configured to engage with the ground 21, or a part of the antenna, or a structure connected mechanically to the antenna. Such fixation elements or members may include a snap arrangement so that the part being held may be inserted from above and pressed down so that the snap holds the structure in place relative to e.g. the rack. The fixation members may be arranged so that they are received in an indent or grove or cut-out of the part being held. This is contemplated to hold the part in place relative to movement in the plane of the part, e.g. lengthwise or sidewise movement of the part.

Figure 2:
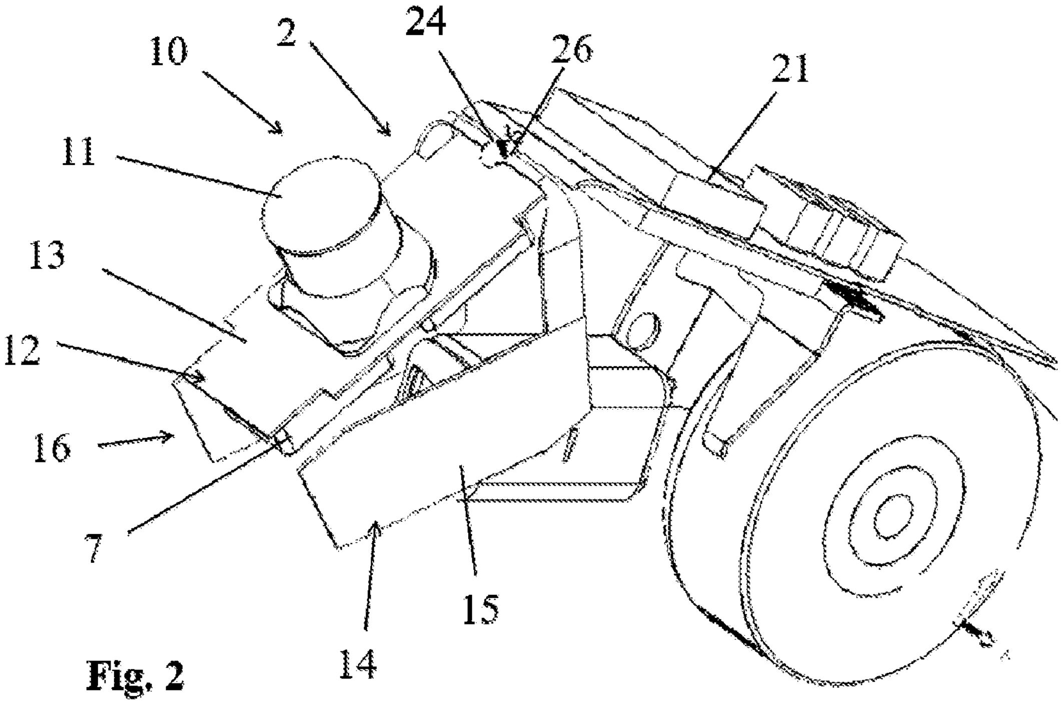
FIG. 2 schematically shows a perspective view of a second embodiment of a hearing device comprising a radio-frequency antenna.

FIG. 2 illustrates a perspective view of a hearing device 30 comprising a radio-frequency antenna 40. This antenna 40 is different from the antenna arrangement shown in FIGS. TA to 1C at least in that the antenna 40 comprises two monopole antenna elements 42 and 44 which are fed in phase. The two elements 42 and 44 are positioned at the front of the hearing device 30. The antenna 40 includes a feed 26. This feed 26 is located at a center, or midpoint, of the antenna 40. The center or midpoint is located so that the distance to the left or right side of the hearing device 30 are equal.

Shown in FIG. 2, the two elements 42 and 44 are symmetrical. It is, however, possible to alter the size and/or shape of the elements so that they are not identical. This is contemplated to allow for compensating for difference in performance of the antenna when placed at the left or right side of the head of the user.

Further, on the PCB making up the antenna 40, a transducer 11 is arranged in an opening. The transducer 11 may be mounted on the surface of the ground element 13 or may protrude through an opening arranged in the ground 13 and may be connected to the printed circuit board 7 which is mounted to the rear side of the ground 13. The transducer 11 may be a telecoil, i.e. a coil configured to receive baseband modulated signals emitted from e.g. a fixed installation.

In FIG. 2, the hearing device 30 is a hearing aid as it is configured to process sound in order to compensate for a user's specific hearing loss prior to providing an output signal that the user can perceive as sound.

In FIG. 2, a relatively long arm 46 extends downward from the ground 13, a corresponding arm extends as the opposite side, although not visible here. The arm 46 connects to a larger surface 15, here substantially rectangular in shape. The arm 46 connect at one end of the surface 15, or rather at one side of a corner of the surface 15. The two elements 42 and 44 are preferably substantially parallel. The two elements 42 and 44 may be arranged so that the distance between then decrease when seen from where the arm 46 connect to the surface 15 and to the distal end of the surface. This would establish a rhomboidal area when viewing the element 42 and the element 44 from above or below. Also, such a narrowing arrangement would accommodate well to the shape of the housing of the hearing device as this part of the hearing device is the part to be located at the top of the pinna during use of the hearing device, i.e. when at least the majority of the housing of the hearing device is placed behind the pinna of the user.

Figure 3:
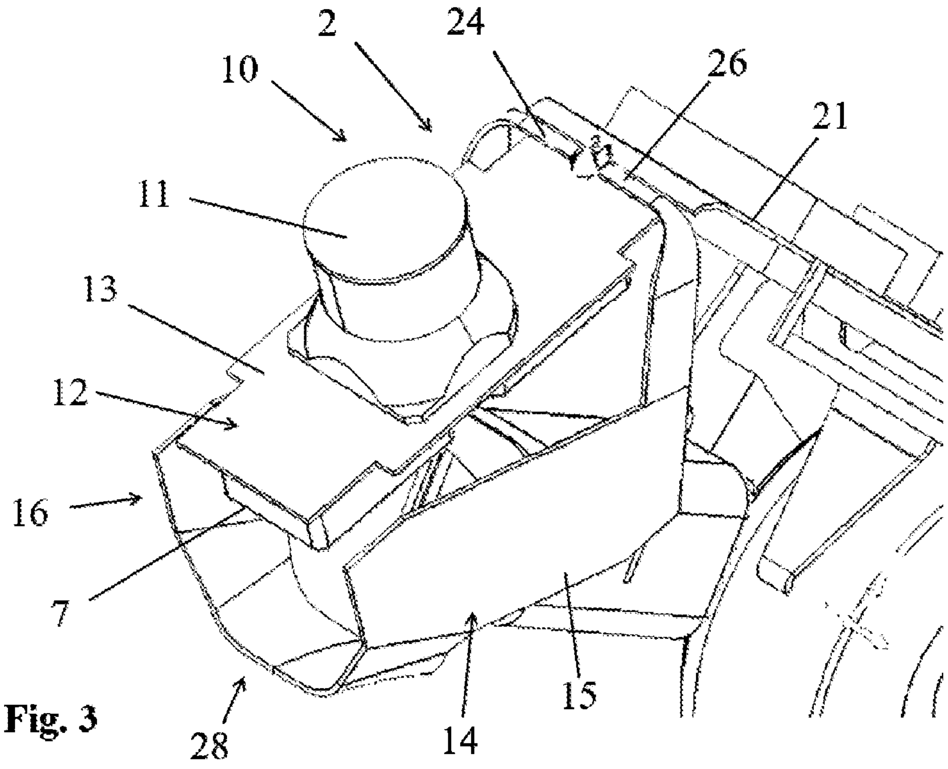
FIG. 3 schematically shows a perspective view of a third embodiment of a hearing device comprising a radio-frequency antenna.

FIG. 3 shows a hearing device 50 comprising a radio-frequency antenna 60. Here, second antenna element 62 (15) and third antenna element 64 (16) are connected (28) in order to form a loop antenna element 66. The distal ends of the second antenna element 62 and the third antenna element 64 are forming one side of the loop, wherein the other side of the loop is formed by the printed circuit board 7 mounted at the rear surface of first antenna element 66. The loop antenna is fed at one arm 24 of the loop and connected to ground at another arm 26. At the loop opening a connection to an output transducer is provided for. In FIG. 3, the hearing device 50 is a hearing aid as it is configured to process sound in order to compensate for a user's specific hearing loss prior to providing an output signal that the user can perceive as sound. As in FIG. 2, the antenna 60 is fed at feed 26 positioned in a midpoint. The midpoint may also be seen as being on or in a plane that extend through the middle of the hearing device.

In FIG. 3, a telecoil 11 extends through an opening in the first antenna element 66. Alternatively, the telecoil may be arranged on top of the ground 13.

In FIGS. 2 and 3, input transducers, such as one or more microphones, may be positioned on a part of the respective antenna. Such an arrangement could in relation to FIG. 3 e.g. be on the surface of the first antenna element 66. Similar arrangement may be achieved in relation to FIG. 2.

By having the telecoil extend through an opening of the antenna as described herein, it is contemplated that the RF antenna and the telecoil will exhibit less interference compared to arrangement where the telecoil e.g. is located at an end opposite of where the RF antenna is located.

The radio-frequency antenna as disclosed above may be used in a hearing instrument comprising an audio converter for reception of an acoustic signal and conversion of the received acoustic signal into a corresponding electrical audio signal, a signal processor for processing the electrical audio signal into a processed audio signal so as to compensate a hearing loss of a user of the hearing instrument, a transducer connected to an output of the signal processor for converting the processed audio signal into an output signal, and a transceiver for wireless data communication, wherein the transceiver is connected to the antenna unit adapted for electromagnetic field emission and/or electromagnetic field reception.

The following embodiments are also disclosed:

A hearing device to be worn at least partly behind an ear of a user, comprising a housing; and a radio-frequency antenna arranged at least partly inside the housing, the radio-frequency antenna configured to receive and/or transmit electromagnetic radio-frequency signals, wherein the radio-frequency antenna comprises:

at least one first antenna element with a plate like first surface, wherein the first antenna element has a feed for electrically connecting the radio-frequency antenna, wherein the first antenna element has a ground connection.

Hearing device wherein the hearing device may further comprise:

a first part and at least one further part, wherein the first part at least partly comprises the radio-frequency antenna and a connection member connecting the housing to an in the ear housing.

Hearing device wherein the radio-frequency antenna may further comprise:

at least one second electrically conductive antenna element with a plate like second surface, wherein the second surface of the at least one second antenna element partly extends in a plane substantially orthogonal to the first surface of the first antenna element. Such as wherein the second surface of the at least one second antenna element partly extends in a plane within 10-15 degrees of orthogonal to the first surface of the first antenna element, such as within 1-5 degrees, such as less than 10 degrees, such as less than 5 degrees.

Hearing device wherein the radio-frequency antenna may further comprise:

at least one third electrically conductive antenna element with a plate like third surface, wherein the third surface of the at least one third antenna element partly extends in a plane substantially orthogonal to the first surface of the first antenna element and wherein the third antenna element is arranged opposite to the second antenna element with regard to the first antenna element.

Hearing device wherein the at least one second antenna element and the at least one third antenna element may be non-resonant elements.

Hearing device wherein the at least one second antenna element and/or the at least one third antenna element may at least partly extend in a plane, wherein the plane may be substantially directed in a downward and/or forward direction from the at least one first antenna element.

Hearing device wherein the at least one second antenna element and the at least one third antenna element may be formed symmetrical, in particular mirror-symmetrical, to each other and/or wherein the at least one second antenna element and/or the at least one third antenna element is electrically connected to the at least one first antenna element.

Hearing device, wherein the at least one second antenna element and/or the at least one third antenna element may be configured to operate as a monopole antenna or monopole antennae.

Hearing device, wherein the at least one second antenna element and the at least one third antenna element may comprise a monopole feed and wherein the at least one second antenna element and the at least one third antenna element may be configured to be fed in phase.

Hearing device, wherein the at least one second antenna element and the at least one third antenna element may form a loop antenna element.

Hearing device, wherein the at least one second antenna element may have a loop feed and the at least one third antenna element may have a loop-shaped ground plane or wherein the at least one third antenna element may have a loop feed and the at least one second antenna element may have a loop-shaped ground plane.

Hearing device, wherein the hearing device may further comprise an audio outlet and/or a hook in order to transmit audio signals into the ear of the user and wherein the loop antenna element at least partly surrounds the audio outlet and/or the hook.

Hearing device, wherein the first antenna element may have at least one opening for a part of a structure of the hearing device.

Hearing device, wherein at least one structure of the hearing device may be arranged inside the at least one opening of the first antenna element, wherein further elements or components of the hearing device, in particular at least one microphone element and/or at least one telecoil, may be mounted on the at least one structure.

Hearing device, wherein at least one element of the hearing device, in particular at least one microphone element, may be integrated into or comprised by the at least one first antenna element.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A hearing device to be worn at least partly behind an ear of a user, comprising a hearing device housing, wherein the housing has a first end and an opposite second end, wherein the first end is configured to be positioned at the top of the ear and the second end is configured to be positioned lower than the first end when the hearing device is worn by a user; and a radio-frequency antenna arranged at least partly inside the housing, the radio-frequency antenna configured to receive and/or transmit electromagnetic radio-frequency signals, wherein the radio-frequency antenna comprises:

at least one first antenna element with a plate like first surface, wherein the first antenna element has a feed for electrically connecting the radio-frequency antenna, wherein the first antenna element has a ground connection, wherein at least part of the radio-frequency antenna is arranged as a loop or IFA antenna, the radio-frequency antenna having or forming a first opening, wherein a transducer is arranged in the opening, and wherein the radio-frequency antenna is arranged at the first end of the hearing device housing and wherein the radio-frequency antenna further comprises:

at least one second electrically conductive antenna element with a plate like second surface, wherein the second surface of the at least one second antenna element partly extends in a plane substantially orthogonal to the first surface of the first antenna element, and at least one third electrically conductive antenna element with a plate like third surface, wherein the third surface of the at least one third antenna element partly extends in a plane substantially orthogonal to the first surface of the first antenna element and wherein the third antenna element is arranged opposite to the second antenna element with regard to the first antenna element.

2. Hearing device according to claim 1, wherein the hearing device further comprises:

a first part and at least one further part, wherein the first part at least partly comprises the radio-frequency antenna and a connection member connecting the housing to an in-the-ear housing, such as a custom shell or custom mold or a speaker unit housing configured to attach with a dome.

3. Hearing device according to claim 1, wherein the at least one second antenna element and the at least one third antenna element are non-resonant elements.

4. Hearing device according to claim 1, wherein the at least one second antenna element and/or the at least one third antenna element at least partly extend in a plane, wherein the plane is substantially directed in a downward and/or forward direction from the at least one first antenna element.

5. Hearing device according to claim 1, wherein the at least one second antenna element and the at least one third antenna element are formed symmetrical, in particular mirror-symmetrical, to each other and/or wherein the at least one second antenna element and/or the at least one third antenna element is electrically connected to the at least one first antenna element.

6. Hearing device according to claim 1, wherein the at least one second antenna element and/or the at least one third antenna element is configured to operate as a monopole antenna.

7. Hearing device according to claim 6, wherein the at least one second antenna element and the at least one third antenna element comprise a monopole feed and wherein the at least one second antenna element and the at least one third antenna element are configured to be fed in phase.

8. Hearing device according to claim 1, wherein the at least one second antenna element and the at least one third antenna element form a loop antenna element.

9. Hearing device according to claim 1, wherein the hearing device further comprises an audio outlet and/or a hook and/or electrical connection in order to transmit audio signals into the ear of the user and wherein the radio-frequency antenna at least partly surrounds the audio outlet and/or the hook.

10. Hearing device according to claim 1, wherein at least one structure of the hearing device is arranged inside the at least one opening of the first antenna element, wherein further elements or components of the hearing device, in particular at least one microphone element and/or at least one telecoil, are mounted on the at least one structure.

11. Hearing device according to claim 1, wherein at least one element of the hearing device, in particular at least one microphone element, is integrated into or comprised by the at least one first antenna element.

12. Hearing device according to claim 1, further comprising an inductive communication unit configured to communicate with a second hearing device to be located at an opposite side of the head of the user of the hearing device.

13. Hearing device according to claim 12, wherein the inductive communication unit comprises a coil configured to communicate at a frequency below 100 MHz, such as below 10 MHz.

14. Hearing device according to claim 1, further comprising a processor electrically connected to a microphone configured to provide a signal representing acoustic sound in the environment of the hearing device, the processor configured to provide a processed signal based on the signal representing acoustic sound where the processed signal is amplified in accordance with a hearing loss of a specific user of the hearing device.

15. Hearing device comprising:

a housing configured to be placed behind the pinna of a user, the housing comprising at least one input transducer configured to provide a signal and a processor configured to receive the signal from the input transducer, the processor configured to process the signal into a processed signal which compensate a specific hearing loss of the user, the housing having a first end and an opposite second end, wherein the first end is configured to be positioned at the top of the pinna and the second end is configured to be positioned lower than the first end when the hearing device is worn by the user; and a radio-frequency antenna arranged inside the housing, the radio-frequency antenna configured to receive and/or transmit electromagnetic radio-frequency signals, the radio-frequency antenna being connected to a wireless interface, wherein the radio-frequency antenna comprises:

a first antenna element with a plate like first surface, wherein the first antenna element has a feed for electrically connecting the radio-frequency antenna, the feed being connected to the wireless interface, wherein the first antenna element has a ground connection, wherein at least part of the radio-frequency antenna is arranged to form a first opening, wherein a transducer is arranged in the first opening, and wherein the radio-frequency antenna is arranged at the first end of the hearing device housing and wherein the radio-frequency antenna further comprises:

a second electrically conductive antenna element with a plate like second surface, wherein the second surface partly extends in a plane substantially orthogonal to the first surface of the first antenna element, and a third electrically conductive antenna element with a plate like third surface, wherein the third surface partly extends in a plane substantially orthogonal to the first surface of the first antenna element and wherein the third antenna element is arranged opposite to the second antenna element with regard to the first antenna element.

16. The hearing device according to claim 15, wherein second surface and the third surface are arranged to be substantially parallel.

17. The hearing device according to claim 15, wherein the wireless interface is configured to transmit and/or receive signals based on Bluetooth protocol.

18. The hearing device according to claim 15, wherein the radio-frequency antenna is configured to operate around 2.4 GHz or around 5 GHz.

* * * * *